JOHN J. KIMBALL.
Improvement in Mechanical Movement.

No. 118,723.  Patented Sep. 5, 1871.

Witnesses:
E. Wolff
Francis McArdle

Inventor:
John J. Kimball
Per Munn & Co.
Attorneys.

UNITED STATES PATENT OFFICE.

JOHN J. KIMBALL, OF NAPERVILLE, ILLINOIS.

IMPROVEMENT IN MECHANICAL MOVEMENTS.

Specification forming part of Letters Patent No. 118,723, dated September 5, 1871.

*To all whom it may concern:*

Be it known that I, JOHN J. KIMBALL, of Naperville, in the county of Du Page and State of Illinois, have invented a new and Improved Mechanical Movement; and I do hereby declare that the following is a full, clear, and exact description thereof, which will enable others skilled in the art to make and use the same, reference being had to the accompanying drawing forming part of this specification, in which—

Figure 1:
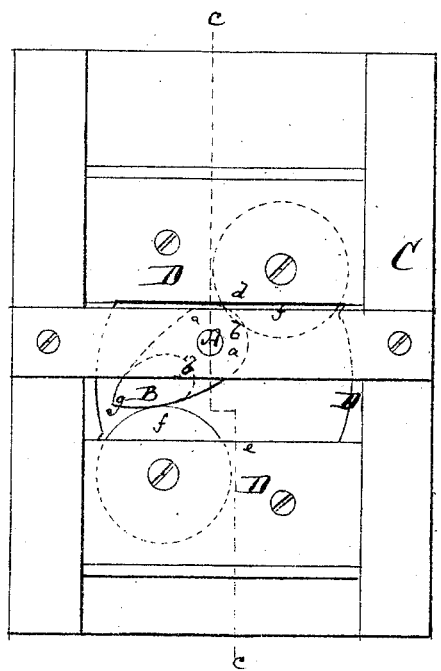
Figure 2:
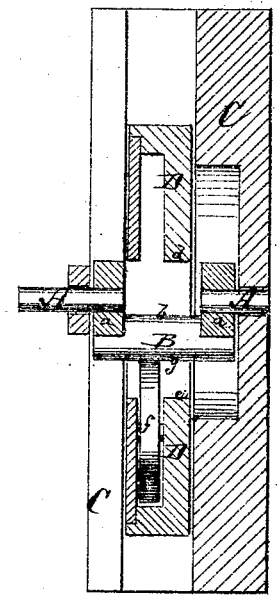

Figure 1 represents a face or plan view of my improved mechanical movement. Fig. 2 is a transverse section of the same on the line $c\ c$, Fig. 1.

Similar letters of reference indicate corresponding parts.

The object of this invention is to construct an anti-friction mechanical movement for converting rotary or oscillating into reciprocating motion, or vice versa. The invention consists in the application of friction-wheels to the reciprocating slide and in their combination with the crank of the rotary or oscillating shaft.

A in the drawing represents a shaft hung in suitable bearings. B is a crank projecting from the shaft A and connected with the same by two ears, $a\ a$. The back $b$ of the cam B between the ears $a\ a$ is of semicircular form, as shown in Fig. 1. The sides of the cam run to a point, $g$. C is a stationary frame carrying a slotted slide, D, through the slot of which the cam is fitted. The slot in the slide D has straight sides $d\ e$ and ends of concave or other shape. $f\ f$ are two wheels hung in the slide D in diagonally-opposite corners of its slot. These wheels come in contact with the cam if the slide is moved back and forth, and turn the said cam and its shaft so as to impart rotary motion, or, if the strokes of the slide are shortened, oscillating motion to the shaft. If the shaft is revolved in either direction it will, by means of the cams striking the wheels $f\ f$, impart reciprocating motion to the slide. The wheels turning readily on or with their axles will thereby considerably reduce the friction of the motion without in the least diminishing the certainty of action.

Having thus described my invention, I claim as new and desire to secure by Letters Patent—

The slotted slide D provided with the wheels $f\ f$, which are diagonally opposite each other, and combined with the crank B, substantially as herein shown and described.

JOHN J. KIMBALL.

Witnesses:
    L. G. KENT,
    M. B. POWELL.